United States Patent
Miao et al.

(10) Patent No.: US 10,475,846 B2
(45) Date of Patent: Nov. 12, 2019

(54) MEDIA SECURITY VALIDATION

(71) Applicant: NCR Corporation, Law Department, Atlanta, GA (US)

(72) Inventors: Yun-Qian Miao, Waterloo (CA); Gary Alexander Ross, Edinburgh (GB)

(73) Assignee: NCR Corporation, Atlanta, GA (US)

( * ) Notice: Subject to any disclaimer, the term of this patent is extended or adjusted under 35 U.S.C. 154(b) by 160 days.

(21) Appl. No.: 15/607,841

(22) Filed: May 30, 2017

(65) Prior Publication Data

US 2018/0350869 A1 Dec. 6, 2018

(51) Int. Cl.
| | | |
|---|---|---|
| *G06T 1/20* | (2006.01) | |
| *H01L 27/146* | (2006.01) | |
| *G07D 7/12* | (2016.01) | |
| *G07D 7/206* | (2016.01) | |
| *G06T 11/00* | (2006.01) | |
| *G06Q 40/02* | (2012.01) | |
| *G06Q 50/10* | (2012.01) | |

(52) U.S. Cl.
CPC .......... *H01L 27/14669* (2013.01); *G06T 1/20* (2013.01); *G06T 11/003* (2013.01); *G07D 7/12* (2013.01); *G07D 7/206* (2017.05); *G06Q 40/02* (2013.01); *G06Q 50/10* (2013.01); *G06T 2210/04* (2013.01)

(58) Field of Classification Search
CPC .. G06T 1/20; G06T 11/0003; H01L 27/14669
See application file for complete search history.

(56) References Cited

U.S. PATENT DOCUMENTS

| | | | | |
|---|---|---|---|---|
| 3,916,194 A | * | 10/1975 | Novak | G07D 7/12 250/338.1 |
| 5,607,040 A | * | 3/1997 | Mathurin, Sr. | G07D 7/00 194/207 |
| 5,915,518 A | * | 6/1999 | Hopwood | G07D 7/128 194/207 |

(Continued)

FOREIGN PATENT DOCUMENTS

| | | |
|---|---|---|
| EP | 1 944 737 A1 | 7/2008 |
| EP | 2 187 359 A1 | 5/2010 |

OTHER PUBLICATIONS

Geng et al., Validation of the MODIS NDVI Products in Different Land-Use Types Using In Situ Measurements in the Heihe River Basin;Sep. 2014; IEEE Geoscience and Remote Sensing Letters, vol. 11, No. 9, (Year: 2014).*

(Continued)

*Primary Examiner* — Marcus H Taningco
*Assistant Examiner* — Djura Malevic
(74) *Attorney, Agent, or Firm* — Schwegman, Lundberg & Woessner

(57) ABSTRACT

A residual Infrared (IR) image is calculated from IR images of valuable media having embedded IR security features and visible light images of the valuable media. Features of the IR residual image are extracted as a template for authenticating valuable media items. The template is applied against a presented valuable media item having an embedded IR security feature for assisting in determining whether the presented valuable media item is genuine and fit for further processing within a valuable media depository.

20 Claims, 8 Drawing Sheets

(56) References Cited

U.S. PATENT DOCUMENTS

| | | | | |
|---|---|---|---|---|
| 6,441,379 | B1* | 8/2002 | Osgood | G01N 21/6452 250/216 |
| 6,883,706 | B2* | 4/2005 | Mastie | G06Q 20/1085 235/375 |
| 7,182,197 | B2* | 2/2007 | Nago | G07D 7/121 194/207 |
| 7,187,795 | B2* | 3/2007 | Jones | G06Q 20/042 209/534 |
| 7,256,874 | B2* | 8/2007 | Csulits | G07D 7/12 356/71 |
| 7,451,913 | B2* | 11/2008 | Blair | G06Q 20/209 235/375 |
| 7,560,697 | B2* | 7/2009 | Hoult | G01J 3/2803 250/349 |
| 7,639,858 | B2* | 12/2009 | Ross | G06K 9/6229 356/71 |
| 7,684,607 | B2* | 3/2010 | Joshi | G07D 7/121 194/302 |
| 7,724,938 | B2* | 5/2010 | Pareskevakos | G06K 9/38 382/135 |
| 7,991,186 | B2* | 8/2011 | Rudaz | G06T 1/005 382/100 |
| 8,086,017 | B2* | 12/2011 | He | G07D 7/20 356/71 |
| 8,094,917 | B2* | 1/2012 | Liu | G07D 7/206 382/135 |
| 8,162,125 | B1* | 4/2012 | Csulits | G07D 7/12 194/206 |
| 8,346,610 | B2* | 1/2013 | Mennie | G06K 9/033 705/16 |
| 8,644,585 | B1* | 2/2014 | Mennie | G06Q 20/042 209/534 |
| 9,004,359 | B2* | 4/2015 | Shearin | G06K 7/10 235/435 |
| 9,129,424 | B2* | 9/2015 | Xue | G06T 11/003 |
| 9,336,638 | B2* | 5/2016 | He | G07D 7/00 |
| 9,672,678 | B2* | 6/2017 | Gao | G07D 7/128 |
| 9,734,648 | B2* | 8/2017 | Angus | G07D 7/08 |
| 9,824,268 | B2* | 11/2017 | He | G06K 9/6215 |
| 2001/0040994 | A1* | 11/2001 | Jang | G07D 7/12 382/135 |
| 2003/0030785 | A1* | 2/2003 | Christophersen | G07D 7/12 356/71 |
| 2003/0107004 | A1* | 6/2003 | Leach | G07D 7/12 250/372 |
| 2003/0187798 | A1* | 10/2003 | McKinley | G06Q 40/04 705/50 |
| 2004/0081332 | A1* | 4/2004 | Tuttle | G06K 9/00442 382/100 |
| 2004/0247169 | A1* | 12/2004 | Ross | G06K 9/6229 382/137 |
| 2006/0180792 | A1* | 8/2006 | Ricci | C03C 3/095 252/301.16 |
| 2007/0140551 | A1* | 6/2007 | He | G06K 9/00 382/159 |
| 2007/0278065 | A1* | 12/2007 | Voser | G07D 7/00 194/317 |
| 2008/0106726 | A1* | 5/2008 | Park | G07D 7/0043 356/71 |
| 2008/0187170 | A1* | 8/2008 | Matsubayashi | G09G 5/003 382/100 |
| 2009/0087077 | A1* | 4/2009 | Nireki | G07D 7/12 382/135 |
| 2010/0147942 | A1* | 6/2010 | Silverbrook | G06Q 10/087 235/375 |
| 2011/0064279 | A1* | 3/2011 | Uno | G07D 7/12 382/112 |
| 2011/0069174 | A1* | 3/2011 | Rapoport | G07D 7/128 348/161 |
| 2011/0147450 | A1* | 6/2011 | Rapoport | G07D 7/1205 235/375 |
| 2012/0067944 | A1* | 3/2012 | Ross | G06K 7/1095 235/375 |
| 2012/0187185 | A1* | 7/2012 | Sayan | G06O 30/0601 235/375 |
| 2012/0273698 | A1* | 11/2012 | Gudgell | G07G 1/0027 250/492.1 |
| 2013/0300101 | A1* | 11/2013 | Wicker | G07D 7/06 283/67 |
| 2014/0002617 | A1* | 1/2014 | Zhang | G01N 15/1463 348/48 |
| 2014/0158496 | A1* | 6/2014 | Angus | G07D 7/08 194/302 |
| 2015/0054959 | A1* | 2/2015 | He | G06K 9/00523 348/150 |
| 2015/0310268 | A1* | 10/2015 | He | G06K 9/6215 382/135 |
| 2016/0325579 | A1* | 11/2016 | Ramesh Sharma | D01F 1/06 |
| 2016/0364936 | A1* | 12/2016 | Gao | G07D 7/128 |
| 2017/0023482 | A1* | 1/2017 | Cicerone | G01N 21/65 |
| 2018/0247308 | A1* | 8/2018 | Miao | G06Q 20/401 |
| 2018/0350869 | A1* | 12/2018 | Miao | G07D 7/12 |

OTHER PUBLICATIONS

European Search Report—dated Oct. 18, 2018.

* cited by examiner

| Orientation | Metric | #Testnote | Original DVM | DVM with solution |
|---|---|---|---|---|
| A | Accept-rate (genuine) | 1240 | 98.7% | 99.4% |
| | False-accept (counterfeit) | 68 | 0.0% | 0.0% |
| | Genuine-counterfeit gap | | 3.10 | 41.38 |
| B | Accept-rate (genuine) | 1233 | 96.7% | 99.2% |
| | False-accept (counterfeit) | 140 | 0.0% | 0.0% |
| | Genuine-counterfeit gap | | 0.61 | 15.80 |
| C | Accept-rate (genuine) | 1225 | 96.0% | 99.2% |
| | False-accept (counterfeit) | 79 | 0.0% | 0.0% |
| | Genuine-counterfeit gap | | 3.08 | 10.08 |
| D | Accept-rate (genuine) | 1238 | 95.6% | 99.3% |
| | False-accept (counterfeit) | 76 | 0.0% | 0.0% |
| | Genuine-counterfeit gap | | 3.00 | 10.83 |
| Average | True-Accept-Rate | | 96.74% | 99.25% |
| | False-Accept-Rate | | 0.00% | 0.00% |

FIG. 1E

MEDIA SECURITY VALIDATION

BACKGROUND

Media handing devices that process media documents and bunches of media documents after separating the media documents for individual processing downstream within the media handling devices. Media handing devices include a variety of integrated components. One type of media document is a banknote or currency note (note).

As the note is processed through the media handling device, a variety of sensors are activated and deactivated to track movement of the note and indicate where the note is located along the transport pathway.

Typically, track sensors or photodiode (emitter) and phototransistor pairs, located on the same or opposing sides of the document track are activated before and/or after media handling components for purposes of transmitting a presence of the note on the track as signals to integrated controllers within the media handling devices.

Depending on the location of a note along the pathway, other devices may be activated, such as a media validation module (device) located in a designated area along the pathway. The media validation module may include cameras, sensors (Infrared, Ultraviolet (UV), etc.) and Light Emitting Diodes (LEDs) that illuminate the face of the note to capture different characteristics of the note for purposes of determining whether the note is counterfeit (fake) or unfit in some manner (excessively damaged).

Infrared security features are increasingly becoming common security features that are integrated into bank notes. Yet, validating an integrated infrared security feature produces far too many false positives for genuine notes. This is so, because the distribution of pixel intensities measured when the note is illuminated with an infrared light produces a low dynamic range for the infrared security feature and large variations for normal wear and tear (soiling, aging effects, etc.) conditions present on the note.

Thus, determining whether a note is genuine and/or in an acceptable condition (fit) for being accepted for a transaction within a media handling device is problematic when the note includes infrared security features combined with other contaminants. As a result, conventional media handling devices have higher than desired rejection rates and lower than desired acceptance rates for notes having infrared security features combined with other contaminants.

SUMMARY

In various embodiments, methods and a system for media security validation processing within a valuable media depository are provided.

According to an embodiment, a method for media security validation processing is presented. Specifically, and in one embodiment, reference images for media items is selected from a plurality of visible light images of the media items. Next, an Infrared (IR) residual image is calculated from IR images of the media items and the selected reference images. Then, features of the IR residual images are extracted as a template. Finally, the template is applied to a presented media item having an embedded IR security feature for assisting in determination as to whether the presented media item is acceptable for further downstream processing within a valuable media depository.

BRIEF DESCRIPTION OF THE DRAWINGS

FIG. 1E is a table depicting test results for tests that compares techniques presented herein against known techniques for counterfeit and genuine notes, according to an example embodiment.

DETAILED DESCRIPTION

Figure 1A:
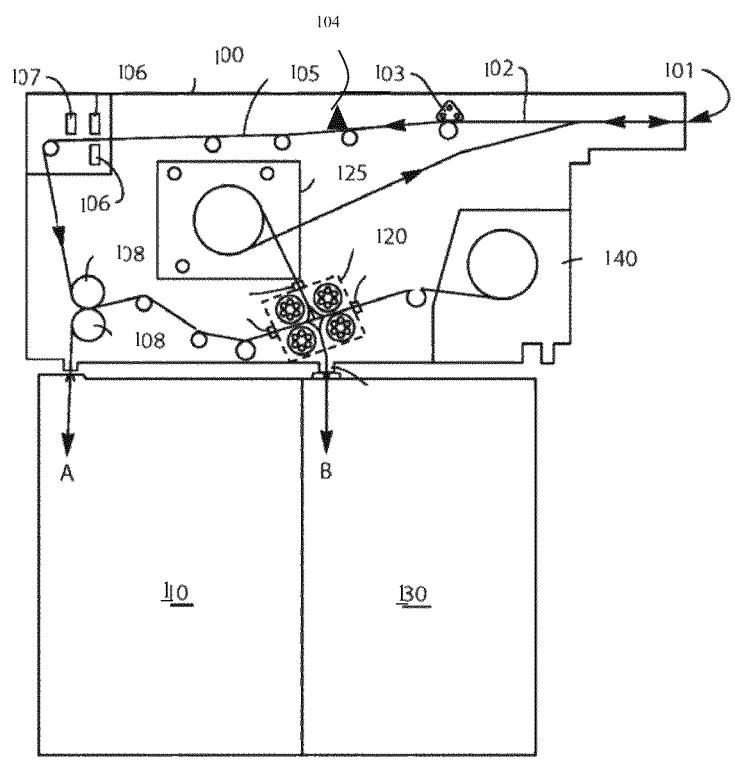
FIG. 1A is a diagram depicting a deposit module of a Self-Service Terminal (SST) having a media validation device (module), according to an example embodiment.

FIG. 1A is a diagram depicting a deposit module of a Self-Service Terminal (SST) having a media validation device (module), according to an example embodiment. It is to be noted that the valuable media depository is shown with only those components relevant to understanding what has been added and modified to a conventional depository for purposes of providing media tracking within one or more imaging devices integrated within the depository 100.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A bunch (stack) of one or more items (valuable media) is input or output. Incoming checks and/or banknotes follow a first transport path 102 away from the mouth 101 in a substantially horizontal direction from right to left shown in the FIG. 1A. They then pass through a novel separator module 103 and from the separator 103 to a deskew module 104 along another pathway portion 105, which is also substantially horizontal and right to left. The items are now deskewed and aligned for reading by imaging cameras 106 (comprising novel imaging devices as discussed herein and below in greater detail with the FIGS. 1B-1C and 2-4) and a Magnetic Ink Character Recognition (MICR) reader 107 by a media validation module (comprising the cameras 106 and MICR reader 107).

Items are then directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks (a type of valuable media/document) and/or banknotes (another type of valuable media/document) to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "valuable media" refers to media of value, such as currency, coupons, checks, negotiable instruments, value tickets, and the like.

For purposes of the discussions that follow with respect to the FIGS. 1A-1E and 2-4, "valuable media" is referred to as currency (currency note and/or check) and the "valuable media depository" is referred to as a "depository." Additionally, valuable media may be referred to as a "document" and/or "media document" herein. Thus, the terms "note," "media item," "banknote," "currency note," and "document" may be used interchangeably and synonymously herein.

Figure 1B:
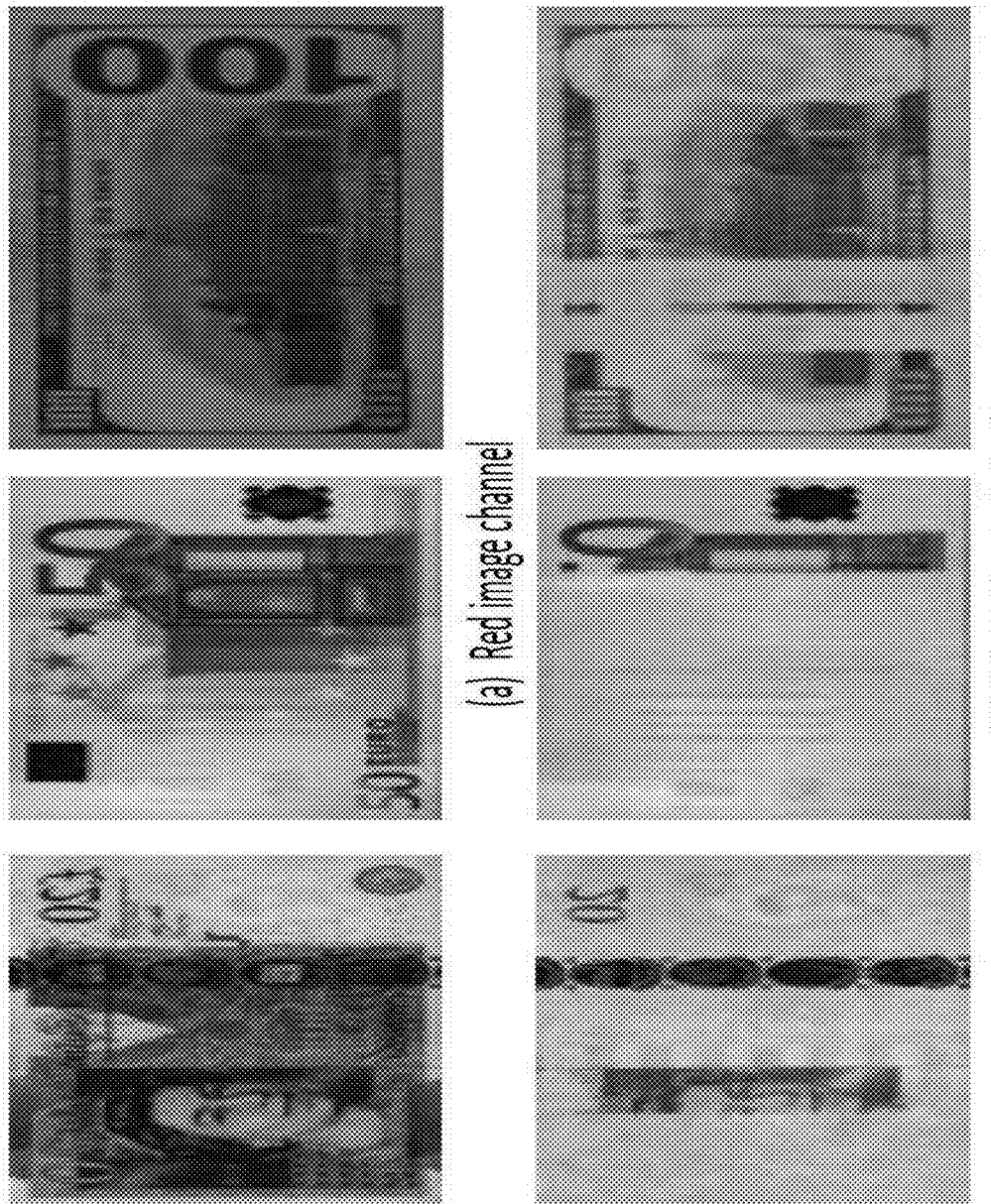
FIG. 1B is a diagram depicting sample currency notes with integrated infrared security features, according to an example embodiment.

FIG. 1B is a diagram depicting sample currency notes with integrated infrared security features, according to an example embodiment.

As will be discussed in greater detail, herein and below, an improved infrared security media validation processing technique is presented that provides lower rejection rates for acceptable media without sacrificing counterfeit detection rates for counterfeit notes from that which has been heretofore available in the industry. The techniques account for media contamination within an acceptable level of tolerance. Therefore, the techniques effectively solve the above-identified industry problems associated with high rejection rates of media having integrated infrared security features and including a degree of contamination.

The currency notes labeled (a) in the FIG. 1A illustrate images captured for the notes when the notes are illuminated with a red light. The same currency notes are also imaged after being exposed to infrared light in the labeled (b) images. The infrared image channel (b) illustrates how integrated infrared security features cause swatches of the images to be whited out. The images (a) and (b) from left to right depict the front side of the Bank of England (£ 20) note, the front side the European Central Bank (€50) note, and back side of the United States ($100) note.

Figure 1C:
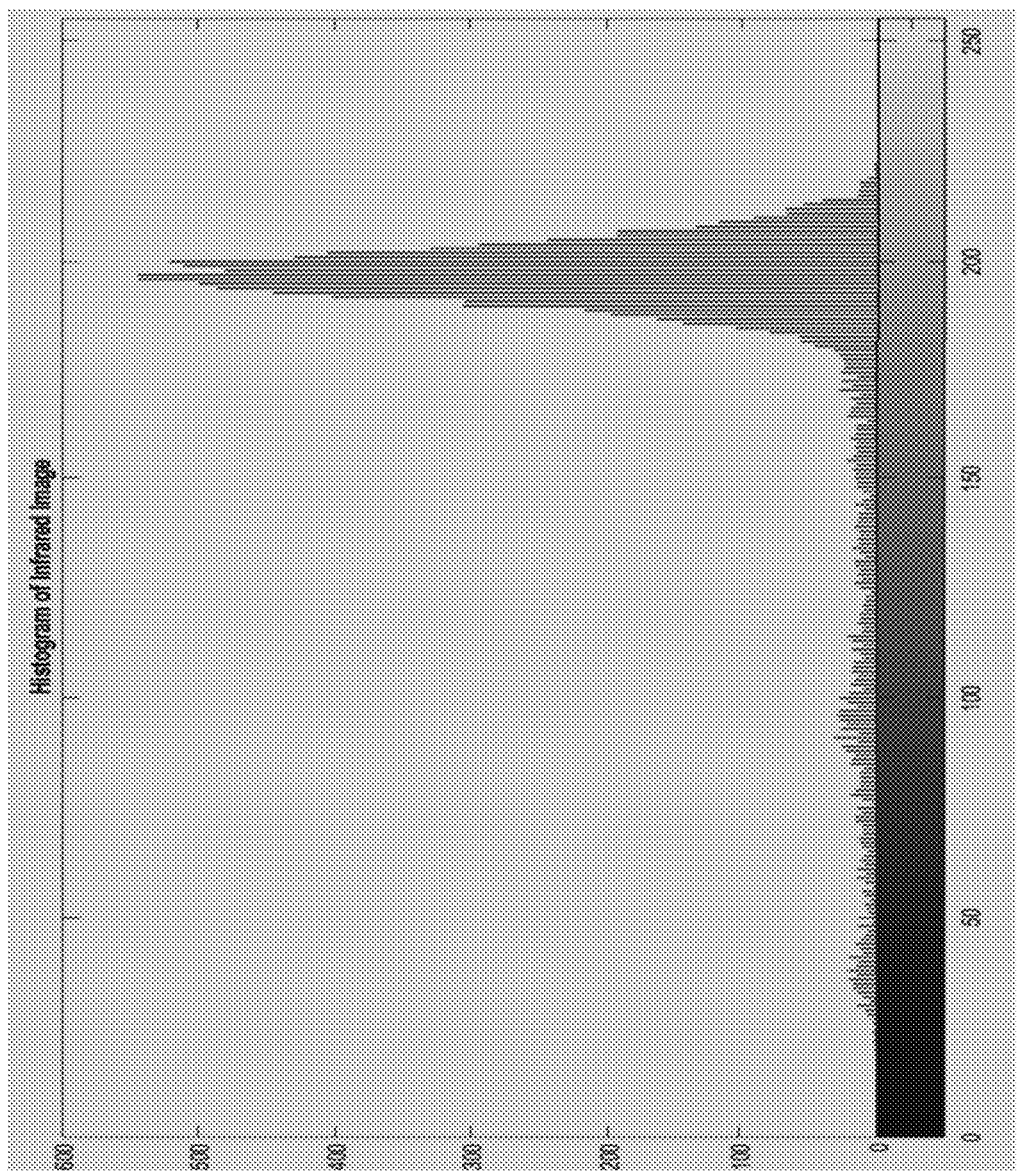
FIG. 1C is a diagram depicting a histogram for infrared pixel readings in a currency note from the FIG. 1B, according to an example embodiment.

FIG. 1C is a diagram depicting a histogram for infrared pixel readings in a currency note from the FIG. 1B, according to an example embodiment.

Specifically, the FIG. 1C plots the histogram of the Infrared (IR) spectrum obtained from an IR image of the Bank of England £ 20 note, which shows the distribution condensed in one extreme side. This illustrates that the infrared spectrum for notes with IR security features have a low dynamic range of pixel intensities and hence small entropy would result in denigration in any IR spectrum distribution modeling.

Currency notes are subjected to a variety of contaminants during circulation. The notes may include anywhere from small minute traces to large amounts of chemical residue. These contaminants do not typically render the notes unfit for continued circulation; however, notes with IR security features exhibit small dynamic ranges that spike quickly for a very short period. Even acceptable trace amounts of chemical residue on the note can make it extremely difficult to determine whether the note is acceptable (fit) for continued circulation when inspecting the IR spectrum from the IR images of the notes because the presence of the chemical residue unduly alters the expected range for the IR spectrum.

Figure 1D:
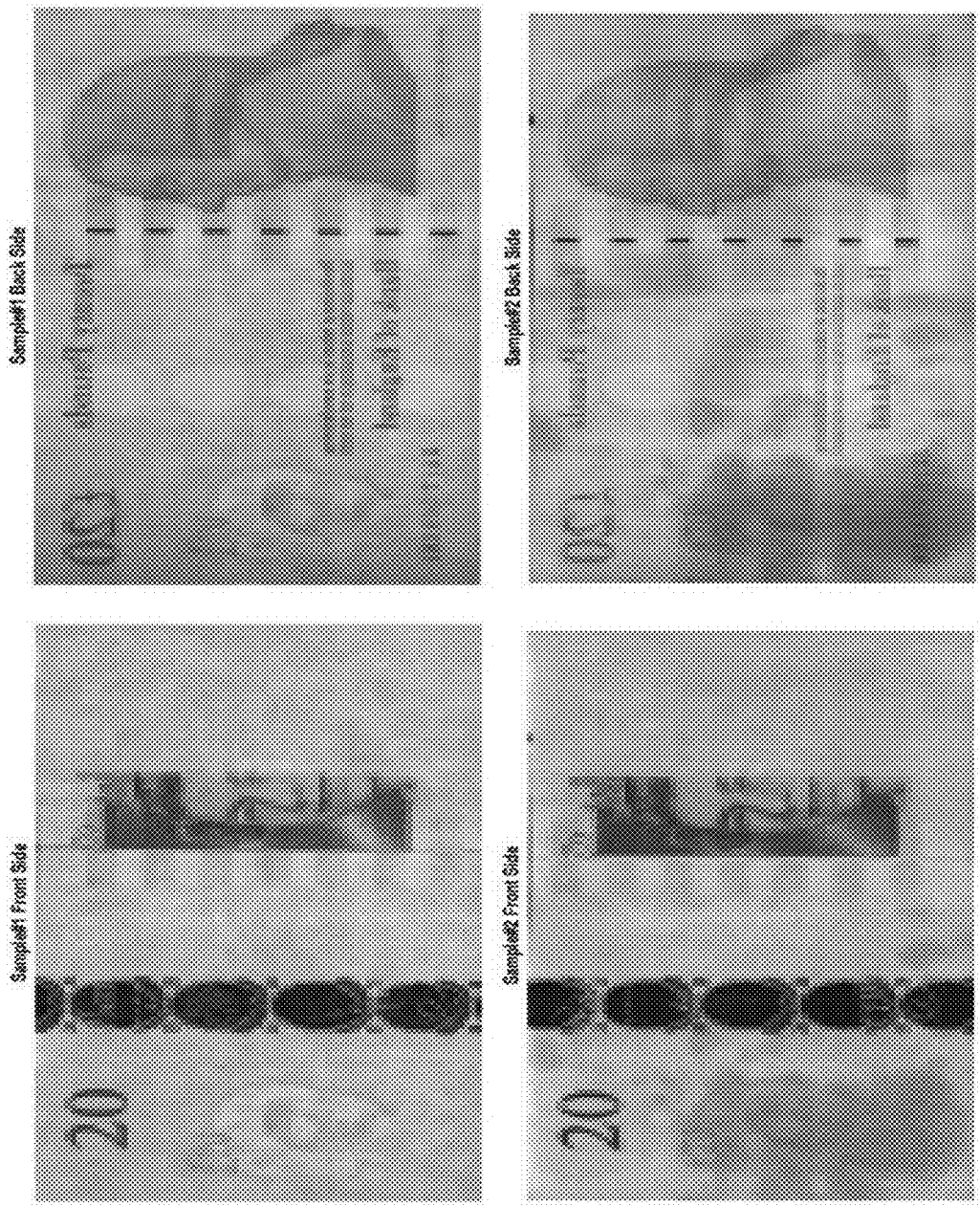
FIG. 1D is a diagram depicting sample currency notes with integrated security features including contaminates on the notes, according to an example embodiment.

The FIG. 1D shows the front and back sides of the Bank of England note and shows the large variation that appears for a contamination when the corresponding IR images are captured. A conventional approach would reject such notes as unacceptable for continued circulation. Even though, the contamination (possibly grease or oil of some kind) is likely barely visible to the human eye (the top images representing IR images of no such contamination and the bottom images representing images being contaminated near the watermark region taken for IR light).

Conventionally, when such a situation was present (media with IR security features and including some contamination), the notes were rejected because one wants to error on the side that a note is non-genuine rather than genuine to do otherwise risks accepting counterfeit notes. This is no longer the case with the techniques presented herein; that is, the rate of counterfeit detection remains unchanged over the conventional approach but the false rejection rates are substantially improved over the conventional approach. Thus, the contaminated notes shown in the FIG. 1D (bottom) row would be processed within the media depository as notes that are fit or acceptable for circulation whereas with conventional approaches the notes would be falsely rejected.

That is, validation of IR images within conventional approaches has become intractable because of the limited IR dynamic range represented by the embedded IR security feature, which, in turn, makes validation problematic when even the slightest contamination is present on the notes. Nearly every note that is in circulation has some contaminants and most often the degree of contaminants are acceptable for the note to remain in continued circulation.

FIG. 1E is a table depicting test results for tests that compares techniques presented herein against known techniques for counterfeit and genuine notes, according to an example embodiment.

The test results show a distinct increase for genuine notes and their overall acceptance rates with no increase in acceptance rates of counterfeit notes. The column labeled "Original DVM" is a conventional Document Validation Module (DVM) approach before the techniques presented herein. The column labeled "DVM with solution" reflects the techniques discussed herein and below. Through the numerous tests, the approaches herein accepted genuine notes with an average accuracy of greater than 99% (99.275%) whereas the conventional approach averaged an accuracy of 96.75%. Significantly, the gap between genuine note response and counterfeit note response increases dramatically. In fact, a minor overlap in data on the reverse-side note orientations becomes a significant separation between the conventional approaches and the approaches discussed herein and below.

The processing discussed herein is executed as firmware/software within a DVM of the depository 100. The processing includes an initial training that proceeds as follows.

(1) The DVM receives multi-spectrum images from the cameras and sensors 106. This is unchanged over the conventional-based approaches, the images can be associated with illuminating the notes with different colors or frequency of light when the images are taken along with an IR sensor for the IR-based images. This includes the visible channels of light and the IR channel. It is noted that other channels are possible as well and can be added without altering the approaches discussed herein.

(2) A reference background image ($I^{BG}$) is formulated from the visible channel images by selection of the reference background from 4 images, the four images are (I indicates image and the channel for the image identified by the exponential notation): $I^{red}$, or $I^{green}$, or $I^{blue}$, or ($I^{red}+I^{green}+I^{blue}$)*⅓). The last image is calculated by adding the blue, red, and green pixels and multiple that sum by ⅓. The $I^{BG}$ is selected as one of the above four noted images.

(3) An IR residual image (noted as $I^{IRres}$) is calculated by the relative difference between the IR channel and the reference channel as:

$I^{IRes}(i,j)=(I^{IR}(i,j)-I^{BG}(i,j))/(I^{IR}(i,j)+I^{BG}(i,j))$; where i,j are the pixel coordinates, IR is the IR pixel values and BG is the pixel values from the selected image in (2).

Steps 1-3 are repeated for a sample set of notes, such as 100 or any configurable number of notes. After this is done for the configured number of notes, the process continues.

(4) Features are extracted according to each pixel's proximity in the space of $I^{IRres}$ and the distribution of the pixels are modeled for genuine notes used in steps 1-3 to formulate a trained template (Temp$^{(IRres)}$) for the genuine notes (Temp$^{(IRres)}$=Train($I^{IRres}$)).

(5) The trained IR residual template (Temp$^{(IRres)}$ resulting from (4)) is applied in production against notes being validated to determine the authenticity of any integrated IR security features for purposes of determining whether the notes being deposited at the depository 100 are genuine and/or fit for continued circulation (Validation$^{(IRres)}$=Test (Temp$^{IRres}$, $I_s^{IRres}$); where $I_s^{IRres}$ is the IR residual image for a new test note that is calculated in the same manner as (3) above.

(6) The IR validation result is combined with other existing outputs used in validation to make a final determination as to whether a note is valid (genuine and fit for continued circulation). This is referred to as a fuse processing step that fuses the other processing outputs can consideration for determining whether the note is valid or not.

(1)-(4) are performed during training, with (1)-(3) being iterative for the configured number of notes for which training occurs. (4) is processed at the conclusion of training (once) to formulate the template. (5)-(6) occur during production once the template is known. (6) indicates that the processing at (5) can be added to the existing scoring based approach that utilizes a variety of validation outputs to determine whether a note presented is within a range of acceptability for purposes of determining whether a note is valid (genuine and fit for continued circulation). Thus, (4)-(6) is not bound to a specific validation procedure and can be added to existing approaches for purposes of reducing false positives (as discussed above) on notes having IR security features with contamination. In fact, the residual image-based approach as discussed in (3)-(4) can be used to enhance other channels (other than IR).

Thus, by modeling the relative differences deduced from an IR residual image instead of using the raw (unchanged) IR image directly (as is done in the industry today), the obstacles faced by the industry with validating IR security features are resolved (as illustrated in (3)-(6))

The IR residual images provide rich information beyond what is available from just the raw IR images because two-fold information is embedded in the IR residual images: 1) the positive values in the IR residual image represents regions that are to be distinguished and highlighted in the IR channel, and 2) the negative values in the IR residual image emphasizes regions having vanishing behavior or less significance in the IR channel. Thus, the variation shown in IR images among different condition of notes is greatly eased because the calculation of the IR residual images in (3) acts as a self-normalization during processing of each sample note that is part of the training process.

The above-discussed processing provides a variety of benefits such as: 1) genuine note acceptance rates by a depository are greatly enhanced because of the IR residual image calculation in (3) includes an implicit normalization by reference a different channel (the selected image from (2)); 2) detection of counterfeit notes becomes more comprehensive than what is provided in the industry by the more effective mechanism presented for examining primarily the IR security features of the notes; 3) the processing can be applied to different currencies without obstacle (for example, the IR residual image calculation (at (3)) can be bypassed when notes do not include the IR security feature; and 4) experimentation with large volumes of different currencies and currency denominations has confirmed the substantial decrease in false positives for unfit notes that are actually fit for circulation (acceptance rates are increased) while at the same time counterfeit determination is enhanced because the template stability is enhanced to focus on the IR security feature of the notes.

These and other embodiments are now discussed with reference to the FIGS. 2-4.

Figure 2:
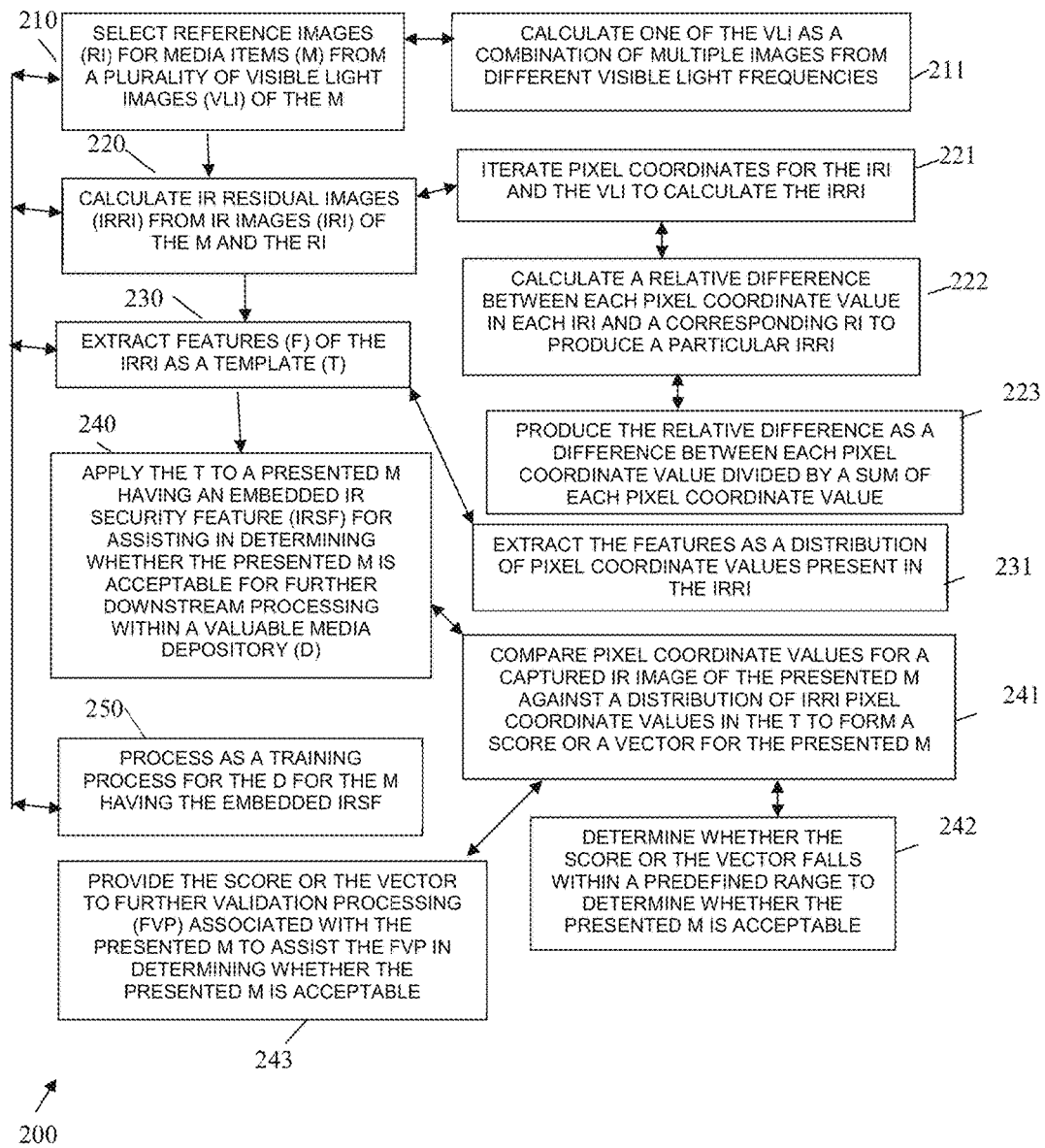
FIG. 2 is a diagram of a method for media security validation processing, according to an example embodiment.

FIG. 2 is a diagram of a method 200 for media security validation processing, according to an example embodiment. The method 200 when processed provides an indication to the valuable media handing device as to whether a media item is genuine and/fit for acceptance and further processing within the valuable media handling device during a transaction. The method 200 is implemented as executable instructions representing one or more firmware/software modules referred to as a "media security validator." The instructions reside in a non-transitory computer-readable medium and are executed by one or more processors of the valuable media depository.

In an embodiment, the media security validator is processed within the valuable media depository/dispenser. In an embodiment, the media validator processes within a media validation module (device) or a document validation module (device) that is integrated into the valuable media depository/dispenser. In an embodiment, the valuable media depository/dispenser is the depository 100.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the media security validator performs, inter alia, the processing discussed above with the FIGS. 1A-1E. In an embodiment, the media security validator is an enhancement to an existing media validation process for use with valuable media having known integrated IR security features.

At 210, the media security validator, selects reference images for media items from a plurality of visible light images of the media items. That is, for each media item a plurality of different visible light images of that media item is taken. Each visible light image representing a specific visible light channel (an image of the media item when the media item is captured on a predefined visible light channel, such as Red, Blue, Green).

According to an embodiment, at 211, the media security validator calculates at least one of the plurality of selectable reference images as a combination image representing different visible light frequencies. This was discussed above as step 2 in the discussion that follows the FIG. 1E, wherein an image to select as a reference image is a combination of red, blue, and green and multiplied by ⅓ (for each pixel value in the three images to create a combination image from three different visible light channels).

At 220, the media security validator calculates IR residual images from the IR image of the media items and the reference images. That is, for each media item the IR residual image is a combination of that media item's IR image and that media item's reference image.

In an embodiment, at 221, the media security validator iterates the pixel coordinates for the IR images and the visible light images to calculate the IR residual images, such that each media item has its own IR residual image.

In an embodiment of 221 and at 222, the media security validator calculates a relative difference between each pixel coordinate value in each IR image and a corresponding reference image to produce a particular IR residual image.

In an embodiment of 222 and at 223, the media security validator produces the relative difference as a difference between each pixel coordinate value divided by a sum of each pixel coordinate value.

The embodiments discussed at 221-223 were discussed above in the discussion that follows the FIG. 1E as processing step 3.

At 230, the media security validator extracts features of the IR residual images as a template. This was presented in the discussion that follows the FIG. 1E as processing step 4.

In an embodiment, at 231, the media security validator extracts the features as a distribution of pixel coordinate values present in the IR residual images.

At 240, the media security validator applies the template to a presented media item having an embedded IT security feature for assisting in determining whether the presented media item is acceptable for further downstream processing within a valuable media depository.

In an embodiment, at 241, the media security validator compares pixel coordinate values for a captured IR image of the presented media item against a distribution of IR residual images' pixel values present in the IR residual images to form a score or a vector for the presented media item.

In an embodiment of 241 and at 242, the media security validator determines whether score or the vector falls within a predefined range to determine whether the presented media item is acceptable.

In an embodiment of 241 and at 243, the media security validator provides the score or the vector to further validation processing associated with the presented media item to assist the further validation processing in determining whether the presented media item is acceptable, According to an embodiment, at 250, the processing at 210 through 230 is processed as a training process for the valuable media depository for the media items that have embedded IR security features. That is, 210-220 is iterative for all the media items, 230 is processed after all the media items have completed 210-220.

Figure 3:
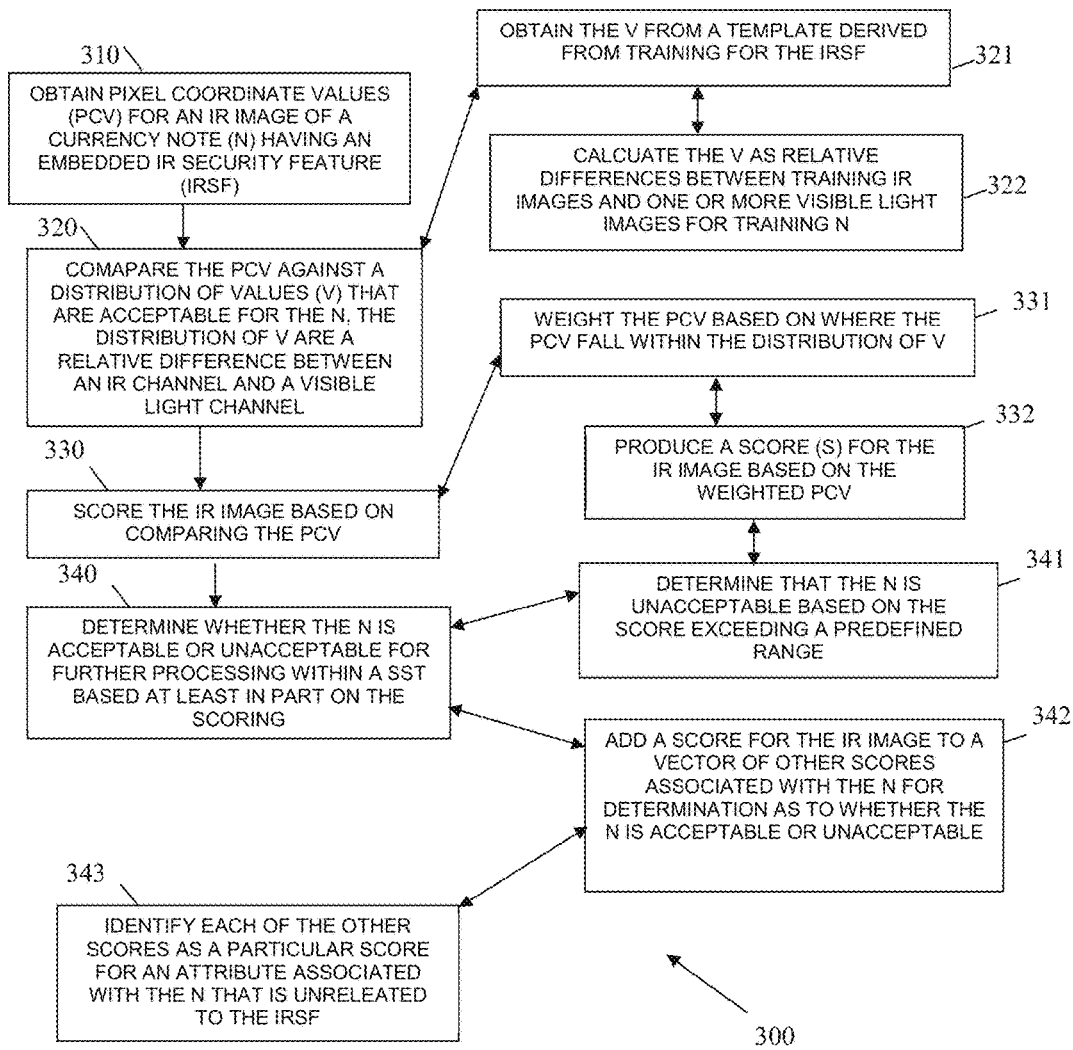
FIG. 3 is a diagram of another method for media security validation processing, according to an example embodiment.

FIG. 3 is a diagram of another method 300 for media security validation processing, according to an example embodiment. The method 300 when processed controls operation for a media validation module (peripheral device) integrated into a valuable media depository/dispenser. The method 200 is implemented as executable instructions representing one or more firmware/software modules referred to as a "note validator." The instructions reside in a non-transitory computer-readable medium and are executed by one or more processors of the valuable media depository.

In an embodiment, the valuable media depository/dispenser is the depository 100.

In an embodiment, the valuable media depository/dispenser s a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the note validator performs all or some combination of the processing discussed above with the FIGS. 1A-1E and 2.

In an embodiment, the note validator is executed as firmware/software programmed instructions in memory of a media validation peripheral device or a depository/dispenser.

In an embodiment, the note validator presents another and in some ways an enhanced processing perspective from that which was described with the method 200 and the FIG. 2.

At 310, the note validator obtains pixel coordinate value for an image of a currency note having an embedded IR security feature while the currency note is being presented for processing at a SST.

At 320, the note validator compares the pixel coordinate values against a distribution of values that are acceptable for the note. The distribution of the values are a relative difference between an IR channel and a visible light channel.

According to an embodiment, at 321, the note validator obtains the values from a template derived from training for the IR security feature.

In an embodiment of 321 and at 322, the note validator calculates the value as relative differences between training IR images and one or more visible light images for training on a plurality of currency notes having the IR security feature.

At 330, the note validator scores the IR image based on the comparison processing at 320.

In an embodiment, at 331 the note validator weights the pixel coordinate values based on where the pixel coordinate values fall within the distribution of values.

In an embodiment of 331 and at 332, the note validator produces a score for the IR image based on the weighted pixel coordinate values.

At 340, the note validator determines whether the note is acceptable or unacceptable for further processing with the SST based at least in part on the score processing at 330.

In an embodiment of 332 and 340, at 341 the note validator determines that the currency note is unacceptable based on the score exceeding a predefined range. That is, the score can be so out of range that further validation processing is unnecessary and a determination can be made that the currency note is unacceptable for further processing with the SST.

In an embodiment of 340 and at 342, the note validator adds a score for the IR image to a vector of other scores associated with the currency note for determination as to whether the currency note is acceptable or unacceptable. Here, the score for the IR image is one of many other scores associated with the currency note that is used to determine whether the currency note is acceptable or unacceptable.

In an embodiment of 342 and at 343, the note validator identifies each of the other scores as a particular score for an attribute associated with the currency note that is unrelated to the embedded IR security feature.

Figure 4:
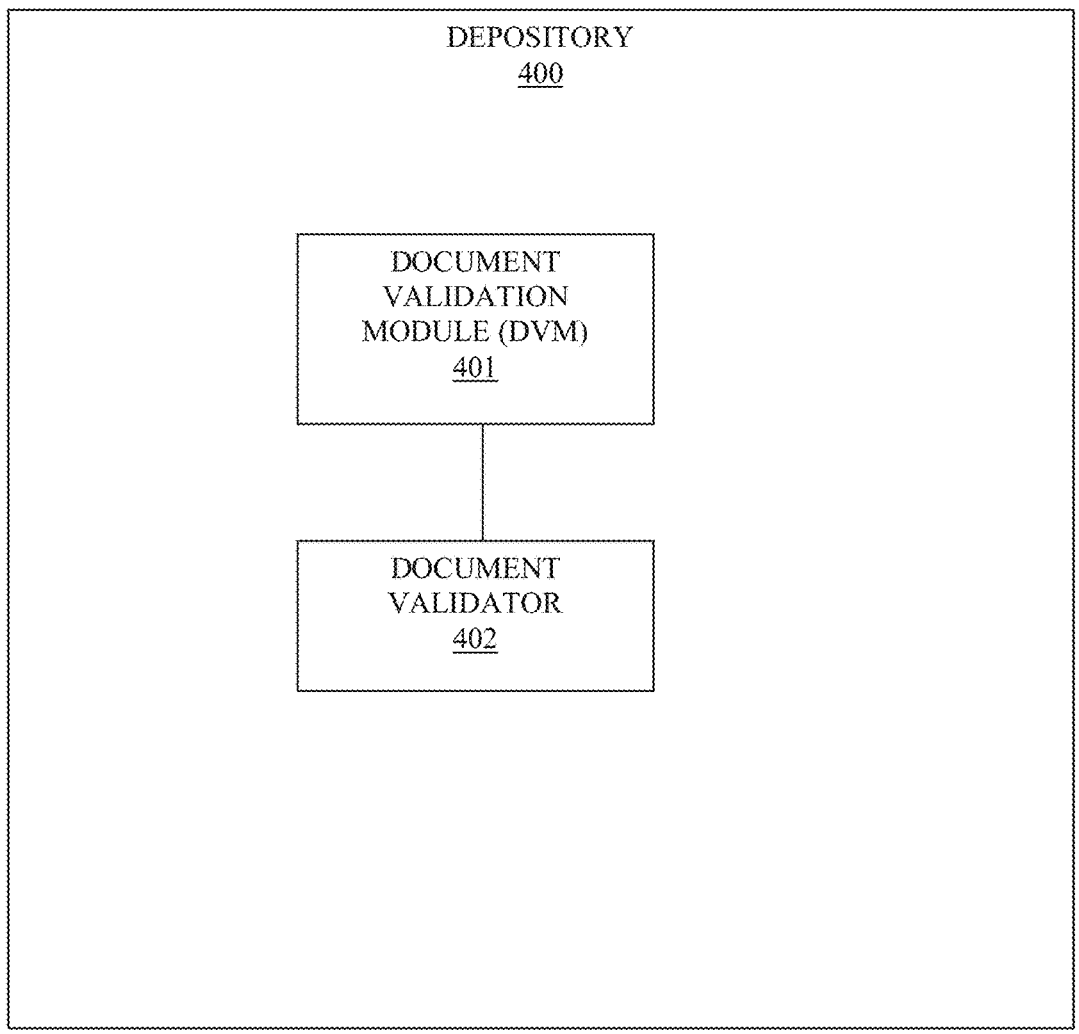
FIG. 4 is a diagram of a valuable media depository, according to an example embodiment.

FIG. 4 is a diagram of a valuable media depository 400, according to an example embodiment. The valuable media depository 400 records and processes IR signal readings using a variety of mechanical, electrical, and software/firmware components (such as IR sensors, lighting sources, track pathway, memory, electrical circuitry, processors, etc.), some of which were discussed above with reference to the FIGS. 1A-1E and the FIGS. 2-3.

In an embodiment, the valuable media depository 400 is the depository 100.

In an embodiment, the valuable media depository 400 is integrated within a SST (ATM or kiosk) or a POS terminal.

In an embodiment, the valuable media depository 400 performs, inter aha, all or some combination of the processing discussed above in the FIGS. 1A-1E and 2-3.

The valuable media depository 400 includes a DVM 401 and a document validator 402.

The document validator 401 is configured and programmed to: i) process on at least one hardware processor of the depository 400 or the DVM 401 and ii) determine whether a currency note is genuine and fit for processing within the depository by accounting for a relative difference between IR attributes of the currency note and visible light attributes of the currency note. The attributes obtained from pixel values associated with an IR image of the currency note and pixel values associated with one or more visible light images of the currency note. The mechanisms in which this is done was presented in detail above with the discussion of the FIGS. 1A-1E and 2-3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   (i) selecting reference images for media items from a plurality of visible light images of the media items, wherein selecting further includes selecting 3 of 4 of the reference images from three visible light images associated with: red-light pixel values, green-light pixel values, blue-light pixel values, and a sum of the red-light pixel values, green-light pixel values, and blue-light pixel values added to together with the sum multiplied by $1/3$, and selecting a $4^{th}$ of the reference images as the blue-light pixel values added to the green-light pixel values;
   (ii) calculating Infrared (IR) residual images from IR images of the media items and the selected reference images;
   (iii) extracting features of the IR residual images as a template; and
   (iv) applying the template to a presented media item having an embedded IR security feature for assisting in determining whether the presented media item is acceptable for further downstream processing within a valuable media depository.

2. The method of claim 1, wherein (i) further includes calculating one of the plurality of visible light images as a combination of multiple images from different visible light frequencies.

3. The method of claim 1, wherein (ii) further includes iterating pixel coordinates for the IR images and the reference images to calculate the IR residual images.

4. The method of claim 3, wherein iterating further includes calculating a relative difference between each pixel coordinate value in each IR image and a corresponding reference image to produce a particular IR residual image.

5. The method of claim 4, wherein calculating further includes producing the relative difference as a difference between each pixel coordinate value divided by a sum of each pixel coordinate value.

6. The method of claim 1, wherein (iii) further includes extracting the features as a distribution of pixel coordinate values present in the IR residual images.

7. The method of claim 1, wherein (iv) further includes comparing pixel coordinate values for a captured IR image of the presented media item against a distribution of IR residual pixel coordinate values present in template to form a score or a vector for the presented media item.

8. The method of claim 7, wherein comparing further includes determining whether the score or the vector falls within a predefined range to determine whether the presented media item is acceptable.

9. The method of claim 8, wherein comparing further includes providing the score or the vector to further validation processing associated with the presented media item to assist with the further validation processing in determining whether the presented media item is acceptable.

10. The method of claim 1 further includes processing (i)-(iii) as a training process for the valuable media depository for the media items having the embedded IR security feature.

11. A method, comprising:
   obtaining pixel coordinate values for an Infrared (IR) image of a currency note having an embedded IR security feature;
   comparing the pixel coordinate values against a distribution of values that are acceptable for the currency note, wherein the distribution of values are a relative difference between an IR channel and a visible light channel, wherein the visible light channel includes a selection of 3 sets of pixel coordinate values from: red light, green light, blue light, and a sum of the red light, the green light, and the blue light with the sum multiplied by $1/3$, and wherein the visible light channel also includes 1 set of pixel coordinate values that includes the blue light added with the green light;
   scoring the IR image based on comparing the pixel coordinate values; and
   determining whether the currency note is acceptable or unacceptable for further processing within a Self-Service Terminal based at least in part on the scoring.

12. The method of claim 11, wherein comparing further includes obtain the values from a template derived from training for the IR security feature.

13. The method of claim 12, wherein comparing further includes calculating the values as relative differences between training IR images and one or more visible light images for training currency notes.

14. The method of claim 11, wherein scoring further includes weighting the pixel coordinate values based on where the pixel coordinate values fall within the distribution of values.

15. The method of claim 14, wherein weighting further includes producing a score for the IR image based on the weighted pixel coordinate values.

16. The method of claim 15, wherein determining further includes determining that the currency note is unacceptable based on the score exceeding a predefined range.

17. The method of claim 11, wherein determining further includes adding a score for the IR image to a vector of other scores associated with the currency note for determination as to whether the currency note is acceptable or unacceptable.

18. The method of claim 17, wherein determining further includes identifying each of the other scores as a particular score for an attribute associated with the currency note that is unrelated to the IR security feature.

19. A depository, comprising:
a document validation module/device (DVM) integrated into the depository; and
a document validator configured to: i) execute on at least one hardware processor of the DVM or the depository and ii) determine whether a currency note is genuine and fit for processing within the depository by accounting for a relative difference between Infrared (IR) attributes of the currency note and visible light attributes of the currency note, wherein the visible light attributes include a selection of 3 sets of visible light attributes selected from: red-light pixel values, green-light pixel values, blue-light pixel values, and a sum of the red-light pixel values, green-light pixel values, and blue-light pixel values added to together with the sum multiplied by $\frac{1}{3}$, and the visible light attributes also include 1 set of visible light attributes as the blue-light pixel values added to the green-light pixel values.

20. The depository of claim 19, wherein the depository is integrated into one of: a Self-Service Terminal (SST), an Automated Teller Machine (ATM), a kiosk, and a Point-Of-Sale (POS) terminal.

* * * * *